July 25, 1933.  J. H. YOUNG  1,919,677
PROTECTED METAL ARTICLE
Filed Aug. 7, 1930
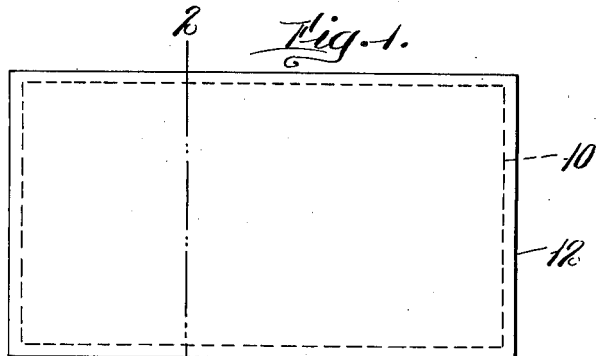
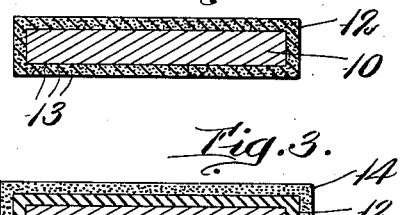
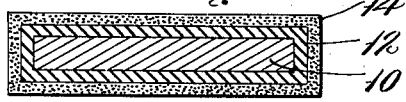
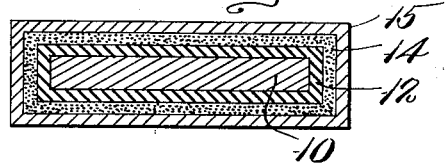
Inventor.
James Howard Young
by Jas. H. Churchill
Atty.

Patented July 25, 1933

1,919,677

UNITED STATES PATENT OFFICE

JAMES HOWARD YOUNG, OF PITTSBURGH, PENNSYLVANIA, ASSIGNOR TO H. H. ROBERTSON COMPANY, OF PITTSBURGH, PENNSYLVANIA, A CORPORATION OF PENNSYLVANIA

PROTECTED METAL ARTICLE

Application filed August 7, 1930. Serial No. 473,720.

This invention relates to a protected metal article and particularly to a protected steel sheet having a protective layer of rubber.

The invention has for its object to provide a rubber protected article which is fire and weather resisting and has a non-adhesive exterior surface, whereby the rubber protected metal sheets when erected or incorporated in the building are capable of resisting fire and weather conditions and are also capable of being shipped without danger of sticking together especially under warm climatic conditions.

The invention further has for its object to provide a protected metal sheet of the character described, in which the protection of the steel sheet may be obtained with a minimum amount of protective material, as will be described.

To these ends, the metal article, which will be hereinafter referred to as a steel sheet, is preferably sealed at its side and end edges within an envelop of rubber to which it is firmly affixed, and which has applied to it or incorporated with it a sufficient amount of fire-resisting material, preferably chlorinated-diphenyl but which may be a material which is capable of liberating a non-combustible gas under the heat conditions of a fire but which is stable under normal conditions of exposure.

The fire-resisting rubber protected steel sheet may be provided with a non-tacky exterior surface by incorporating the fire-resisting material or materials with the rubber, or when the rubber layer is rendered fire-resisting by a layer or film of chlorinated-diphenyl applied thereto, the non-tacky exterior surface may be obtained by applying to the fire-resisting layer anti-stick material or by incorporating with the fire-resisting layer a material or materials which will render it non-tacky, as will be described.

These and other features of this invention will be pointed out in the claims at the end of this specification.

Fig. 1 represents in plan a protected metal sheet embodying this invention;

Fig. 2, a cross section on the line 2—2, Fig. 1, illustrating a preferred embodiment of the weather and fire-resisting non-adhesive protective envelop, and Figs. 3 and 4, like sections of modifications of the protective envelop.

Referring to the drawing, 10 represents a steel sheet such as is commonly used in the construction of roofs and sidings of buildings and which may be flat or corrugated as desired or required.

The steel sheet 10 has affixed to it in any suitable or known manner a layer 12 of vulcanized rubber, which is waterproof and non-adhesive on its outer surface, and which as illustrated in Fig. 2 has incorporated in it a fire-resisting material, preferably chlorinated-diphenyl, which is represented in Fig. 2 by the stipple 13 and which is present in sufficient quantity to provide the rubber layer 12 with a fire-resisting exterior surface, which latter is also non-adhesive to such extent as to enable the protected metal sheets to be shipped without sticking together.

The fire-resisting exterior surface of the protected metal sheet may be obtained by incorporating or mixing the fire-resisting chlorinated-diphenyl into or with the rubber of the layer 12 before the latter is vulcanized, and such fire-resisting surface is represented in Fig. 2.

On the other hand, the fire-resisting surface may be obtained by applying to the rubber layer 12 after it has been vulcanized a layer 14 of chlorinated-diphenyl as represented in Fig. 3, and this layer may be rendered non-tacky by incorporating therewith a suitable material such as China-wood oil, or it may have applied to it a layer 15 of known anti-stick material as illustrated in Fig. 4.

In Fig. 2 the thickness of the metal sheet 10 and of the rubber layer 12 is exaggerated to enable them to be clearly shown, and the same is true in Figs. 3 and 4.

It is preferred to seal the steel sheet within the rubberized fire-resisting and weatherproof envelop having an exterior surface which is non-sticky, and such protected steel sheet is especially adapted for use in the construction of buildings, as it is capable of being made of minimum thickness and at a minimum cost, is durable, can be shipped without sticking and effectively resists fire and weather conditions.

The fire-resisting material may be mixed with the rubber before the latter is vulcanized, or as represented in Figs. 3 and 4, the rubber layer or layers may be vulcanized and affixed to the steel sheet and then covered with a layer of the fire-resisting material.

A fire-resisting rubber composition employing chlorinated-diphenyl may be made according to the following formula, to wit:

| | Per cent by weight |
|---|---|
| Rubber | 12 |
| Chlorinated-diphenyl | 30 |
| Powdered $SiO_2$ | 48 |
| ZnO | 9.2 |
| Sulfur | .72 |
| Zimate (Accelerator) | .08 |

Certain proportions of the ingredients are set forth in the above formula, but it is not desired to limit the invention to the particular proportions specified.

The rubber chlorinated-diphenyl film or layer may be applied to the steel sheet by using emulsions to obtain the film or layer or by depositing the film from solutions of the ingredients in solvents such as benzol or in any other known manner or by applying calendered layers of the chlorinated-diphenyl rubber to the steel sheet. Therefore it is not desired to limit the invention to a steel sheet having the rubber layer affixed thereto in any particular manner or to any particular way in which the rubber-covered steel sheet has its exterior surface rendered fire-resisting.

What is claimed is:

1. A protected metal sheet for building purposes having a rubber-covered metal sheet provided with a fire-resisting and weather-resisting exterior surface of chlorinated-diphenyl.

2. A protected metal sheet for building purposes having a steel sheet provided with a layer of rubber rendered fire and weather-resisting by chlorinated-diphenyl associated therewith.

JAMES HOWARD YOUNG.